(12) United States Patent
Landa et al.

(10) Patent No.: US 6,743,846 B2
(45) Date of Patent: *Jun. 1, 2004

(54) PREPARATION OF FLAME RETARDANT EXPANDABLE POLY(ARYLENE ETHER)/POLYSTYRENE COMPOSITIONS

(75) Inventors: Adrie Landa, Bergen op Zoom (NL); Jan Keulen, Ossendrecht (NL)

(73) Assignee: General Electric Company, Pittsfield, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/427,278

(22) Filed: May 1, 2003

(65) Prior Publication Data

US 2003/0203999 A1 Oct. 30, 2003

Related U.S. Application Data

(63) Continuation of application No. 09/681,605, filed on May 7, 2001, now Pat. No. 6,583,205.

(51) Int. Cl.⁷ .............................. C08J 3/00; C08J 9/16; C08J 9/18; C08K 5/51; C08L 73/00
(52) U.S. Cl. .......................... 524/508; 521/56; 521/60; 521/139; 521/180; 524/136; 524/502
(58) Field of Search .................. 524/136, 502, 524/508; 521/56, 60, 139, 180

(56) References Cited

U.S. PATENT DOCUMENTS

| | | |
|---|---|---|
| 3,078,254 A | 2/1963 | Zelinski et al. |
| 3,265,765 A | 8/1966 | Holden et al. |
| 3,297,793 A | 1/1967 | Dollinger |
| 3,402,159 A | 9/1968 | Hsieh et al. |
| 3,594,452 A | 7/1971 | De La Mare et al. |
| 4,254,775 A | 3/1981 | Langer |
| 4,507,436 A | 3/1985 | Axelrod et al. |
| 4,618,633 A | 10/1986 | Taubitz et al. |
| 4,727,093 A | 2/1988 | Allen et al. |
| 4,782,098 A | 11/1988 | Allen et al. |
| 4,874,796 A | 10/1989 | Allen et al. |
| 4,920,153 A | 4/1990 | Allen et al. |
| 4,968,466 A | 11/1990 | Allen et al. |
| 5,008,298 A | 4/1991 | Allen et al. |
| 5,064,869 A | 11/1991 | Bopp et al. |
| 5,091,256 A | 2/1992 | Bopp et al. |
| 5,095,041 A | 3/1992 | Bopp et al. |
| 5,128,073 A | 7/1992 | Allen et al. |
| 5,130,340 A | 7/1992 | Allen et al. |
| 5,190,986 A | 3/1993 | Allen et al. |
| 5,621,029 A | 4/1997 | Eckel et al. |
| 6,583,205 B2 * | 6/2003 | Landa et al. |

FOREIGN PATENT DOCUMENTS

| | | |
|---|---|---|
| EP | 0 176 774 | 8/1985 |
| GB | 1 264 741 | 3/1970 |
| GB | 2 043 083 | 3/1979 |

OTHER PUBLICATIONS

JP 09165508. Publication Date Jun. 24, 1997. Abstract Only. 1 page.
JP 10316792. Publication Date Dec. 2, 1998. Abstract Only. 1 page.

* cited by examiner

Primary Examiner—Patrick D. Niland

(57) ABSTRACT

A non-halogenated, fire retardant, expandable poly (arylene ether)/polystyrene blends is produced by the method comprising, in a first step, forming a fire retardant mixture comprising a non-halogenated fire retardant, poly(arylene ether) resin and polystyrene resin by intimately mixing in melt; and in a second step, forming the non-halogenated, fire retardant, expandable poly (arylene ether)/polystyrene blend by intimately mixing in melt the fire retardant mixture with a blowing agent.

15 Claims, No Drawings

US 6,743,846 B2

PREPARATION OF FLAME RETARDANT EXPANDABLE POLY(ARYLENE ETHER)/ POLYSTYRENE COMPOSITIONS

CROSS REFERENCE TO RELATED APPLICATIONS

This application is a continuation of U.S. patent application Ser. No. 09/681,605, filed on May 7, 2001, now U.S. Pat. No. 6,583,205 which is hereby incorporated by reference.

STATEMENT REGARDING FEDERALLY SPONSORED RESEARCH & DEVELOPMENT

Not Applicable

BACKGROUND OF THE INVENTION

This invention relates to the field of expandable poly (arylene ether)/polystyrene compositions and more particularly to the field of flame retardant expandable poly(arylene ether)/polystyrene compositions.

Increasingly plastics are being used to replace metals in a wide variety of applications ranging from car exteriors to aircraft interiors. Flame retardant plastics have been especially useful, particularly in applications such as housings for electronic devices. The use of plastic instead of metal decreases weight, improves sound dampening and makes assembly of the device easier. Flame resistance has been dominantly provided by halogenated flame retardants. However, plastics employing halogenated flame retardants release toxic gas when heated to elevated temperatures and produce non recyclable waste streams. As a result non-halogenated fire resistant materials are in demand for a wide range of applications.

The most widely used process for making expandable poly(arylene ether)/polystyrene is via the styrene suspension polymerization process. Terminally end capped poly(arylene ether) resin is dissolved in the styrene monomer prior to polymerization and polymerization proceeds by the suspension process. During or at the end of polymerization a blowing agent is added. At the end of the process poly (arylene ether)/polystyrene expandable beads are recovered. Terminally endcapped poly(arylene ether) resin is required so the poly(arylene ether) resin does not inhibit the polymerization of the styrene. Unfortunately, the capping agent introduces by products and interferes with polymerization, resulting in low yield. Additionally, the poly(arylene ether) resin has limited solubility in the monostyrene, restricting the amount of poly(arylene ether) resin that can be added to the blend. This, in turn, limits the high temperature properties of the resulting poly(arylene ether)/polystyrene materials. The high viscosity of the composition limits the amount of additives, such as flame retardants and impact modifiers that can be included. Furthermore, only halogenated flame retardants may be used. Thus the styrene polymerization process for making expandable poly(arylene ether)/ polystrene has several drawbacks including limited poly (arylene ether) resin solubility, modified poly(arylene ether) resin is required, a halogenated flame retardant is required, and high viscosity. These drawbacks limit the potential to manufacture expandable poly(arylene ether)/polystyrene materials with advanced properties through the suspension process.

BRIEF SUMMARY OF THE INVENTION

Non-halogenated, fire retardant, expandable poly (arylene ether)/polystyrene blends are produced by the method comprising, in a first step, forming a fire retardant mixture comprising a non-halogenated fire retardant, poly(arylene ether) resin and polystyrene resin by intimately mixing in melt; and in a second step, forming the non-halogenated, fire retardant, expandable poly (arylene ether)/polystyrene blend by intimately mixing in melt the fire retardant mixture with a blowing agent.

The above discussed and other features and advantages will be appreciated and understood by those skilled in the art from the following detailed description.

BRIEF DESCRIPTION OF THE DRAWINGS

Not Applicable

DETAILED DESCRIPTION OF THE PREFERRED EMBODIMENTS

A non-halogenated, fire retardant, expandable poly (arylene ether)/polystyrene blend is produced by the method comprising, in a first step, forming a fire retardant mixture comprising a non-halogenated fire retardant, poly(arylene ether) resin polystyrene resin and optional impact modifier by intimately mixing in melt; and, in a second step, forming the non-halogenated, fire retardant, expandable poly (arylene ether)/polystyrene blend by intimately mixing in melt the fire retardant mixture with a blowing agent. Preferably the first step is performed in a first extruder and the second step is performed in a tandem extruder comprising extruder A and extruder B. Intimate mixing of the fire retardant mixture and blowing agent to form a non-halogenated, fire retardant, expandable poly (arylene ether)/ polystyrene blend occurs in extruder A of the tandem extruder and cooling of the non-halogenated, fire retardant, expandable poly (arylene ether)/polystyrene blend occurs in extruder B of the tandem extruder. Cooling of the non-halogenated, fire retardant, expandable poly (arylene ether)/ polystyrene blend prevents premature foaming of the blend at the die.

The non-halogenated, fire retardant, expandable poly (arylene ether)/polystyrene blends exhibit excellent molding performance and excellent fire retardant properties at various thicknesses while maintaining desirable heat dimensional stability. Surprisingly, the non-halogenated, fire retardant, expandable poly (arylene ether)/polystyrene blends exhibit better fire retardant properties, namely short flame out time and non flaming drip behavior, than conventional halogenated, fire retardant, expandable poly (arylene ether)/polystyrene blends. The non-halogenated, fire retardant, expandable poly (arylene ether)/polystyrene blends can achieve an HBF rating or better in the UL ASTM D 4986/ISO/DIS 9772.3 flammability test, something not previously seen in an expandable poly(arylene ether)/ polystyrene blend. The excellent fire retardant properties are unexpected and are believed to be the result of the thorough distribution of the non-halogenated fire retardant throughout the expandable poly(arylene ether)/polystyrene blend. The non-halogenated, fire retardant, expandable poly (arylene ether)/polystyrene blends do not require specially end capped poly(arylene ether) resin, have on line processability, can be colored to a wide range of colors and have a wide range of thermal properties.

An additional advantage of the method to produce poly (arylene ether)/polystyrene blends herein described is the ability to incorporate significantly larger amounts of poly (arylene ether) into the blend than currently possible using the suspension polymerization process. As previously mentioned poly(arylene ether) has limited solubility in mono styrene thus restricting the amount of poly(arylene ether) present in a poly(arylene ether)/polystyrene blend produced by suspension polymerization. In contrast, the method herein described can incorporate about 25 weight percent (wt %) of poly(arylene ether) or greater, preferably about 40 wt % or greater or even more preferably about 50 wt % or greater, based on the weight of the composition.

All conventional poly(arylene ether)s can be employed. The term poly(arylene ether) includes polyphenylene ether (PPE) and poly(arylene ether) copolymers; graft copolymers; poly(arylene ether) ether ionomers; and block copolymers of alkenyl aromatic compounds, vinyl aromatic compounds, and poly(arylene ether), and the like; and combinations comprising at least one of the foregoing; and the like. Poly(arylene ether)s per se, are known polymers comprising a plurality of structural units of the formula (I):

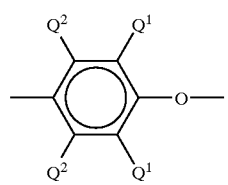

(I)

wherein for each structural unit, each $Q^1$ is independently halogen, primary or secondary lower alkyl (e.g., alkyl containing up to 7 carbon atoms), phenyl, haloalkyl, aminoalkyl, hydrocarbonoxy, halohydrocarbonoxy wherein at least two carbon atoms separate the halogen and oxygen atoms, or the like; and each $Q^2$ is independently hydrogen, halogen, primary or secondary lower alkyl, phenyl, haloalkyl, hydrocarbonoxy, halohydrocarbonoxy wherein at least two carbon atoms separate the halogen and oxygen atoms, or the like. Preferably, each $Q^1$ is alkyl or phenyl, especially $C_{1-4}$ alkyl, and each $Q^2$ is hydrogen.

Both homopolymer and copolymer poly(arylene ether) are included. The preferred homopolymers are those containing 2,6-dimethylphenylene ether units. Suitable copolymers include random copolymers containing, for example, such units in combination with 2,3,6-trimethyl-1,4-phenylene ether units or copolymers derived from copolymerization of 2,6-dimethylphenol with 2,3,6-trimethylphenol. Also included are poly(arylene ether) containing moieties prepared by grafting vinyl monomers or polymers such as polystyrenes, as well as coupled poly(arylene ether) in which coupling agents such as low molecular weight polycarbonates, quinones, heterocycles and formals undergo reaction in known manner with the hydroxy groups of two poly(arylene ether) chains to produce a higher molecular weight polymer. Poly(arylene ether)s of the present invention further include combinations comprising at least one of the above.

The poly(arylene ether) generally has a number average molecular weight of about 3,000–40,000 atomic mass units (amu) and a weight average molecular weight of about 20,000–80,000 amu, as determined by gel permeation chromatography. The poly(arylene ether) may have an intrinsic viscosity of about 0.10 to about 0.60 deciliters per gram (dl/g), preferably about 0.29 to about 0.48 dl/g, as measured in chloroform at 25° C. It is also possible to utilize a high intrinsic viscosity poly(arylene ether) and a low intrinsic viscosity poly(arylene ether) in combination. Determining an exact ratio, when two intrinsic viscosities are used, will depend somewhat on the exact intrinsic viscosities of the poly(arylene ether) used and the ultimate physical properties that are desired.

The poly(arylene ether) are typically prepared by the oxidative coupling of at least one monohydroxyaromatic compound such as 2,6-xylenol or 2,3,6-trimethylphenol. Catalyst systems are generally employed for such coupling; they typically contain at least one heavy metal compound such as a copper, manganese or cobalt compound, usually in combination with various other materials.

Particularly useful poly(arylene ether) for many purposes are those which comprise molecules having at least one aminoalkyl-containing end group. The aminoalkyl radical is typically located in an ortho position to the hydroxy group. Products containing such end groups may be obtained by incorporating an appropriate primary or secondary monoamine such as di-n-butylamine or dimethylamine as one of the constituents of the oxidative coupling reaction mixture. Also frequently present are 4-hydroxybiphenyl end groups, typically obtained from reaction mixtures in which a by-product diphenoquinone is present, especially in a copper-halide-secondary or tertiary amine system. A substantial proportion of the polymer molecules, typically constituting as much as about 90% by weight of the polymer, may contain at least one of said aminoalkyl-containing and 4-hydroxybiphenyl end groups.

It will be apparent to those skilled in the art from the foregoing that the contemplated poly(arylene ether) include all those presently known, irrespective of variations in structural units or ancillary chemical features. Poly(arylene ether) resin is present in about 5 weight percent (wt %) to 95 wt % based on the weight of the composition, preferably about 30 wt % to about 60 wt % based on the weight of the composition.

The term polystyrene as used herein includes polymers prepared by methods known in the art including bulk, suspension and emulsion polymerization, which contain at least 25% by weight of structural units derived from a monomer of formula (II)

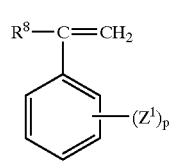

(II)

wherein $R^8$ is hydrogen, lower alkyl or halogen; $Z^1$ is vinyl, halogen or lower alkyl; and p is from 0 to about 5. These resins include homopolymers of styrene, chlorostyrene and vinyltoluene, random copolymers of styrene with one or more monomers illustrated by acrylonitrile, butadiene, alpha-methylstyrene, ethylvinylbenzene, divinylbenzene and maleic anhydride, and rubber-modified polystyrene resins comprising blends and grafts, wherein the rubber is a polybutadiene or a rubbery copolymer of about 98–70% styrene and about 2–30% diene monomer. Polystyrene resins are known to be miscible with poly(arylene ether) resin in all proportions, and any such blend may contain polystyrene resin in amounts of about 5 wt % to about 95 wt % and preferably about 40 wt % to about 70 wt %, based on the weight of the composition.

Suitable non-halogenated flame retardants are organic phosphates, preferably an aromatic phosphate compound of the formula (III):

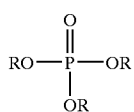

where R is the same or different and is alkyl, cycloalkyl, aryl, alkyl substituted aryl, halogen substituted aryl, aryl substituted alkyl, halogen, or a combination of any of the foregoing, provided at least one R is aryl.

Examples include phenyl bisdodecyl phosphate, phenyl-bisneopentyl phosphate, phenyl-bis (3,5,5'-tri-methyl-hexyl phosphate), ethyldiphenyl phosphate, 2-ethyl-hexyldi(p-tolyl) phosphate, bis-(2-ethylhexyl) p-tolylphosphate, tri-tolyl phosphate, bis-(2-ethylhexyl) phenyl phosphate, tri-(nonylphenyl) phosphate, di (dodecyl) p-tolyl phosphate, tricresyl phosphate, triphenyl phosphate, dibutylphenyl phosphate, 2-chloroethyldiphenyl phosphate, p-tolyl bis(2, 5,5'-trimethylhexyl) phosphate, 2-ethylhexyldiphenyl phosphate, and the like. The preferred phosphates are those in which each R is aryl.

Alternatively, the organic phosphate can be a di- or polyfunctional compound or polymer having the formula (IV), (V), or (VI) below:

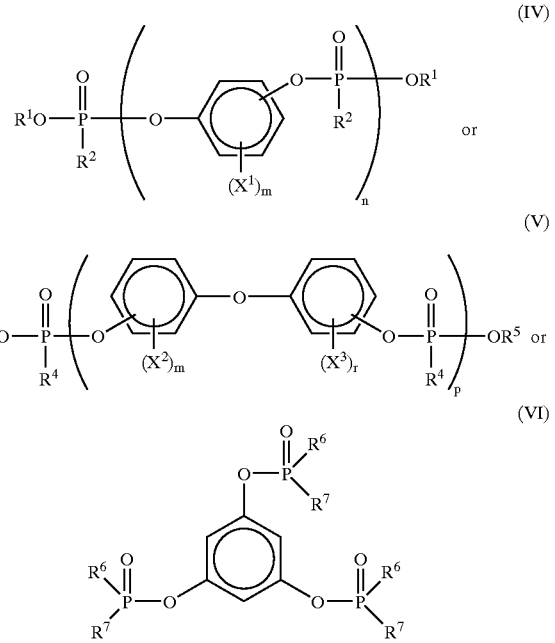

including mixtures comprising at least one of the foregoing compounds, in which $R^1$, $R^3$ and $R^5$ are, independently, hydrocarbon; $R^2$, $R^4$, $R^6$ and $R^7$ are, independently, hydrocarbon or hydrocarbonoxy; $X^1$, $X^2$ and $X^3$ are halogen; m and r are 0 or integers from 1 to 4, and n and p are from 1 to 30.

Examples include the bis diphenyl phosphates of resorcinol, hydroquinone and bisphenol-A, respectively, or their polymeric counterparts.

Methods for the preparation of the aforementioned di- and polyfunctional aromatic phosphates are described in British Patent No. 2,043,083.

Another development is the use of certain cyclic phosphates, for example, diphenyl pentaerythritol diphosphate, as a flame retardant agent for polyphenylene ether resins, as is described by Axelrod in U.S. Pat. No. 4,254,775.

Also suitable as flame-retardant additives are compounds containing phosphorus-nitrogen bonds, such as phosphonitrilic chloride, phosphorus ester amides, phosphoric acid amides, phosphonic acid amides, phosphinic acid amides, tris(aziridinyl) phosphine oxide, or tetrakis(hydroxymethyl) phosphonium chloride.

Preferred phosphate flame retardants include those based upon resorcinol such as, for example, resorcinol tetraphenyl diphosphate, as well as those based upon bis-phenols such as, for example, bis-phenol A tetraphenyl diphosphate. Phosphates containing substituted phenyl groups are also preferred. In an especially preferred embodiment, the organophosphate is butylated triphenyl phosphate ester, resorcinol tetraphenyl diphosphate, bis-phenol A tetraphenyl diphosphate, or a mixture comprising at least one of the foregoing.

The flame retardant is present in an amount sufficient to impart a degree of flame retardancy to the composition to achieve a HBF rating in the UL ASTM D 4986/ISO/DIS 9772.3 test for 12 mm thickness bars. The particular amount will vary, depending on the molecular weight of the organic phosphate, the amount of the flammable resin present and possibly other normally flammable ingredients that might also be included in the composition. Typically the amount of flame retardant is in the range of about 2 wt % to about 25 wt % and preferably about 5 wt % to about 20 wt % based on the weight of the composition.

In general, useful blowing agents are volatile liquids and include but are not limited to aliphatic hydrocarbons, straight chain or branched, with up to 10 carbons; ketones such as acetone and methylethylketone; short chain alcohols such as alcohols having up to 10 carbons; and cycloaliphatic hydrocarbons. Preferred blowing agents are all pentane isomers and mixtures of pentane isomers. An especially preferred blowing agent is n-pentane. Blowing agents are typically used in amounts of about 2 wt % to about 20 wt % based on the weight of the composition, with about 2 wt % to about 10 wt % preferred based on the weight of the composition.

Particularly suitable impact modifiers are the so called block copolymers, for example, A-B-A triblock copolymers and A-B diblock copolymers. The A-B and A-B-A type block copolymer rubber additives which may be used are thermoplastic rubbers comprised of one or two alkenyl aromatic blocks which are typically styrene blocks and a rubber block, e.g., a butadiene block which may be partially hydrogenated. Mixtures of these triblock copolymers and diblock copolymers are especially useful. All impact modifiers generally used for compositions comprising a poly (arylene ether) resin, a polystyrene or a combination of a poly(arylene ether) resin and a polystyrene can be used.

Suitable A-B and A-B-A type block copolymers are disclosed in, for example, U.S. Pat. Nos. 3,078,254, 3,402, 159, 3,297,793, 3,265,765, and 3,594,452 and U.K. Patent 1,264,741. Examples of typical species of A-B and A-B-A block copolymers include polystyrene-polybutadiene (SBR), polystyrene-poly(ethylene-propylene), polystyrene-polyisoprene, poly(α-methylstyrene)-polybutadiene, polystyrene-polybutadiene-polystyrene (SBS), polystyrene-poly(ethylene-propylene)-polystyrene, polystyrene-polyisoprene-polystyrene and poly(α-methylstyrene)-polybutadiene-poly(α-methylstyrene), as well as the hydrogenated versions thereof, and the like. Mixtures comprising at least one of the aforementioned block copolymers are also useful. Such A-B and A-B-A block copolymers are available commercially from a number of sources, including Phillips Petroleum under the trademark SOLPRENE, Shell Chemical Co., under the trademark KRATON, Dexco under the tradename VECTOR, and Kuraray under the trademark SEPTON.

A useful amount of impact modifier is up to about 30 wt % based on the weight of the composition, with about 5 wt % to about 15 wt % based on the weight of the composition preferred. In an especially preferred embodiment, the impact modifier comprises a polystyrene-polybutadiene-polystyrene block copolymer.

Non-halogenated, fire retardant, expandable poly(arylene ether)/polystyrene blends can also include effective amounts of at least one additive selected. Possible additives include anti-oxidants; drip retardants; coating additives; dyes; pigments; colorants; nucleating agents; stabilizers; small particle minerals such as clay, mica, and talc; antistatic agents; plasticizers, lubricants; mold release agents; and mixtures comprising at least one of the foregoing additives. Effective amounts of the additives vary widely, but they are usually present in an amount up to about 50% or more by weight, based on the weight of the entire composition.

The non-halogenated, fire retardant, expandable poly(arylene ether)/polystyrene blends are formed by intimately mixing poly(arylene ether) resin, polystyrene resin, and optional impact modifier in melt with a non-halogenated fire retardant. Preferably the poly(arylene ether) resin, polystyrene resin, and optional impact modifier are melted and mixed and the non-halogenated fire retardant is then added and intimately mixed to form a fire retardant mixture. All mixing equipment capable of mixing in melt may be used although an extruder is preferred. Use of an extruder for the formation of the fire retardant mixture appears to enhance the distribution of the non-halogenated fire retardant. Without being bound by theory, it is believed that even distribution of the non-halogenated fire retardant allows the non-halogenated, fire retardant, expandable mixture to achieve an HBF rating in the UL ASTM D 4986/ISO/DIS 9772.3 flammability test. The fire retardant poly(arylene ether)/polystyrene mixture is then mixed in melt with a blowing agent, preferably in a tandem extruder, and cooled. Use of a tandem extruder for melt mixing the fire retardant mixture with the blowing agent to form the non-halogenated, fire retardant, expandable poly (arylene ether)/polystyrene blend allows the melt mixing to occur in extruder A of the tandem extruder and cooling of the blend to occur in extruder B of the tandem extruder thereby preventing premature devolatization of the blowing agent at the extruder die.

The invention is further illustrated by the following non-limiting examples.

EXAMPLES

The materials used in the following examples is listed in Table 1.

TABLE 1

| Material | Source and/or Trade Name | Properties |
|---|---|---|
| Poly(arylene ether) | GE Plastics, PPO ® | I.V. = 32 ml/gram at 25° C. in toluene |
| Polystyrene | GE/Huntsman 2114 | MW = 206,000 |
| Impact Modifier (SBS) | Kraton Shell/D-1102 | — |
| Flame retardant | Daihachi Chemical/RDP | — |

The comparative example was formed using NORYL® EF, commercially available from GE Plastics. NORYL® EF is a poly(arylene ether)/polystyrene blend with hexabromocyclododecane (HBCD) as a flame retardant. The formulation of NORYL® EF is shown in Table 2.

Examples 1, 2, and 3 were made according to the formulations shown in Table 2 using a ZSK28 twinscrew extruder from Werner & Pfleiderer. The Comparative Example employs polystyrene resulting from a suspension process which does not contain polybutadiene. The polystyrene in Examples 1–3 contains polybutadiene. In Examples 2 and 3, the poly(arylene ether) resin and polystyrene resin were added, using different feeders, to the extruder. In Example 1 the polystyrene resin was split fed, about 46% of the polystyrene resin was added with the poly(arylene ether) resin and the remainder was added by a separate feeder. The resorcinol diphosphate was added by a liquid injection pump after the addition of the polystyrene was complete. In Example 3 the impact modifier (SBS) was added with the poly(arylene ether) as a mixture. The melt temperature was in the range of about 301° C. to about 311° C. Temperatures after melt were in the range of about 210° C. to about to about 270° C. The examples were then direct gassed in a tandem extruder with pentane.

TABLE 2

| Material | 1 | 2 | 3 | Comparative Example |
|---|---|---|---|---|
| Poly(arylene ether) | 30 | 50 | 40 | 10 |
| Polystyrene | 65 | 35 | 35 | 90 |
| Impact modifier | — | — | 15 | — |
| Resorcinol Diphosphate | 5 | 15 | 10 | — |
| HBCD | — | — | — | 1.5 |
| Pentane | 6 | 6 | 6 | 6 |

Total composition: poly(arylene ether) + polystyrene + impact modifier (when present) + resorcinol diphosphate = 100 wt %.
Pentane content is expressed in parts by weight per 100 parts by weight of total composition (poly(arylene ether), polystyrene, optional impact modifier, resorcinol diphosphate, and pentane).

The examples were foam molded into 12 millimeter thickness bars and 6 millimeter thickness bars for testing for flammability according to UL ASTM 4986/ISO/DIS 9772.3, a horizontal burning test for foamed materials. This flammability test rates performance in the following manner: non-classified (NC) which is the worst flaming behavior, medium flame retardant performance (HBF), and superior flame retardant performance (HF1). Superior flame retardant performance is defined as short flame out times and non dripping behavior. The 12 mm bars were examined for molding quality and heat dimensional stability. Molding quality is expressed in terms of the degree of fusion at the surface of a molded part and at the fracture of a broken part. Heat dimensional stability is the temperature at which the shrinkage of the molded part heated in an air circulated oven is less than 0.1%. The results are shown in Table 3. Values in brackets are for 6 mm bars.

TABLE 3

| Properties | 1 | 2 | 3 | Comparative Example |
|---|---|---|---|---|
| Molding quality | Excellent | Good | Good | Excellent |
| Heat Dimensional Stability in ° C. | 104 | 104 | 104 | 105 |
| Average flame out time in seconds | 33.3 [2.0] | 0 [0] | 24.8 [7.6] | 32 [11.6] |
| Dripping (% out of 5 bars) | 0 | 0 | 0 | 100 |
| UL Rating | HBF [HBF] | HF1 [HF1] | HBF [HBF] | NC [HBF] |

While the non-halogenated, expandable, fire retardant poly(arylene ether)/polystyrene blends, (Examples 1, 2, and 3) show comparable molding quality and heat dimensional stability to prior art material (Comparative Example), they show marked improvement in dripping, average flame out time and UL rating. Thus the non-halogenated, expandable, fire retardant poly(arylene ether)/polystyrene blends not only improve upon the properties of available flame retardant poly(arylene ether)/polystyrene blends but they have the added advantages of being non-halogenated and producible in an efficient, cost effective, on line manner.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of making a non-halogenated, fire retardant, expandable poly(arylene ether)/polystyrene blend comprising:

intimately mixing in melt, a poly(arylene ether) resin and a polystyrene resin to form a resin mixture;

intimately mixing in melt the resin mixture with a non-halogenated fire retardant to form a fire retardant mixture and, combining, in melt, the fire retardant mixture with a blowing agent.

2. The method of claim 1, wherein the blowing agent is combined with the fire retardant mixture at a temperature and pressure sufficient to prevent devolatization of the blowing agent.

3. The method of claim 1, wherein the resin mixture and fire retardant mixture are formed in a first extruder and the fire retardant mixture is combined with a blowing agent in a second extruder, and further wherein the second extruder is a tandem extruder.

4. The method of claim 1, wherein the amount of poly(arylene ether) resin is greater than about 25 wt % based on the weight of the composition.

5. The method of claim 1, wherein the resin mixture further comprises an impact modifier.

6. The method of claim 5, wherein the impact modifier is present in amount of up to about 30 wt % based on the weight of the composition.

7. The method of claim 5, wherein the impact modifier is a polystyrene-polybutadiene-polystyrene block copolymer.

8. The method of claim 1, wherein the non-halogenated fire retardant is an aromatic phosphate of the formula (III);

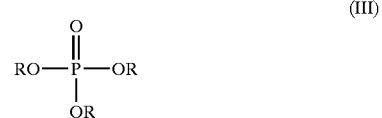

(III)

where R is the same or different and is alkyl, cycloalkyl, aryl, alkyl substituted aryl, halogen substituted aryl, aryl substituted alkyl, halogen, or a combination of any of the foregoing, provided at least one R is aryl.

9. The method of claim 1, wherein the non-halogenated fire retardant is selected from the group consisting of butylated triphenyl phosphate ester, resorcinol diphosphate, resorcinol tetraphenyl diphosphate, bis-phenol A tetraphenyl diphosphate, and mixtures comprising at least one of the foregoing non-halogenated fire retardants.

10. The method of claim 1, wherein the non-halogenated fire retardant is a substituted triphenyl phosphate or an unsubstituted triphenyl phosphate.

11. The method of claim 1, wherein the amount of poly(arylene ether) resin is about 5 weight percent (wt %) to about 95 wt % based on the weight of the composition and the amount of polystyrene resin is about 5 wt % to about 95 wt % based on the weight of the composition.

12. The method of claim 1, wherein the non-halogonated fire retardant is present in an amount of about 2 wt % to about 25 wt % based on the weight of the composition.

13. The method of claim 1, wherein the blowing agent is selected from the group consisting of aliphatic hydrocarbons with up to 10 carbons, ketones, short chain alcohols with up to 10 carbons, cycloaliphatic hydrocarbons and mixtures comprising at least one of the foregoing blowing agents.

14. The method of claim 1, wherein the blowing agent is selected from the group consisting of pentane isomers and mixtures of pentane isomers.

15. The method of claim 1, wherein the blowing agent is present in an amount of about 2 wt % to about 20 wt % based on the weight of the composition.

* * * * *